Patented Oct. 13, 1953

2,655,546

UNITED STATES PATENT OFFICE 2,655,546

PREPARATION OF TERTIARY ALKYL ARYL ETHERS

Donald R. Stevens, Wilkinsburg, and Robert S. Bowman, Pittsburgh, Pa., assignors to Gulf Research & Development Company, Pittsburgh, Pa., a corporation of Delaware No Drawing. Application April 26, 1951, Serial No. 223,142

11 Claims. (Cl. 260—612)

This invention relates to a process for preparing tertiary alkyl aryl ethers.

So far as we have been able to determine, no efficient method is known whereby tertiary alkyl aryl ethers can be prepared economically in desirable quantities. The Williamson synthesis has proved unsatisfactory because only small yields can be obtained. Slightly larger yields of tertiary alkyl aryl ethers have been obtained by the Grignard reaction but this reaction has proved to be too expensive to be practical.

Various attempts have been made to obtain tertiary alkyl aryl ethers by reacting isoolefins with phenols in the presence of sulfuric acid. However, large amounts of sulfuric acid, from about 5 per cent to 100 per cent, were employed and the yields of ether were very small.

Many valuable tertiary alkyl aryl ethers can be prepared by the process of our invention. Among the new tertiary alkyl aryl ethers which have been prepared by this process are tert-butyl-m-tolyl ether, the tertiary butyl ether of p-tert-butyl phenol and the t-butyl ether of p-diisobutyl phenol. These ethers are excellent solvents for organic residues and are particularly good for dissolving the resinous or varnish-like deposits formed in the crank case of internal combustion engines.

We have discovered that tertiary alkyl aryl ethers can be obtained in larger yields than were previously obtainable by reacting an isoolefin and a phenol at a temperature not exceeding about 65° C. in the presence of a trace, not exceeding 0.28 mol per cent based on the phenol, of a catalyst selected from the group consisting of sulfuric acid, chlorosulfonic acid, benzene sulfonic acid, alkali metal acid sulfates, alkyl acid sulfates having 1 to 9 carbon atoms and di-sec-alkyl sulfates having 3 to 6 carbon atoms in each alkyl group, the amount of said catalyst being varied depending upon the temperature employed, smaller amounts of the catalyst being used at higher temperatures; and thereafter stabilizing the resulting reaction product containing a tertiary alkyl aryl ether against said ether's rearranging to form the corresponding alkyl phenol.

As stated above, the catalysts which we employ are selected from the group consisting of sulfuric acid, chlorosulfonic acid, benzene sulfonic acid, alkali metal acid sulfates, alkyl acid sulfates having 1 to 9 carbon atoms and di-sec-alkyl sulfates having 3 to 6 carbon atoms in each alkyl group. Typical alkyl acid sulfates included in the above group are methyl acid sulfate, ethyl acid sulfate, isopropyl acid sulfate, tert-butyl acid sulfate, sec-butyl acid sulfate, tert-amyl acid sulfate, hexyl acid sulfates, heptyl acid sulfates, 2-ethylhexyl acid sulfate, and nonyl acid sulfates. These alkyl acid sulfates cannot be isolated as such. Accordingly, compositions containing the alkyl acid sulfates are generally employed. One suitable composition is a mixture of one mol of the particular alcohol with one mol of sulfuric acid. The alkali metal acid sulfates included are potassium acid sulfate and sodium acid sulfate. The di-sec-alkyl sulfates include diisopropyl sulfate, di-sec-butyl sulfate, di-sec-amyl sulfate, and di-sec-hexyl sulfates. Of these catalysts, sulfuric acid is usually preferred because of its inexpensiveness and efficiency.

We have found, quite unexpectedly, that when the catalyst is mixed with a diluent such as, for example, water, glycerin, or in some cases, an inert solvent, somewhat larger amounts of catalyst can be employed. It should be understood that all of the amounts specified herein are exclusive of any diluent present. For example, when a 10 per cent aqueous solution of sulfuric acid is used, the maximum amount of $H_2SO_4$ is about 0.55 mol per cent in contrast to about 0.28 mol per cent when no diluent is present. If more than about 0.28 mol per cent based on the phenol of a catalyst such as, for example, 96 per cent sulfuric acid, or more than about 0.55 mol per cent of $H_2SO_4$ employed as a 10 per cent aqueous solution is used, the product formed in abundance will be the alkyl-substituted phenol instead of the ether.

The amount of the catalyst employed and the reaction temperature are important factors influencing the yield of ethers obtained by the present process. The relationship between the amount of catalyst and the temperature is not a rigid relationship in the sense that only one fixed amount of catalyst can be employed at a given temperature, but rather it is such that for any given reactant temperature there is an optimum amount of catalyst which can be employed advantageously, and the higher the temperature, the lower will be the optimum amount of catalyst. At room temperature, for example, more or less than the optimum amount can be employed to give fair yields of ether, and the yield obtained is not as sensitive to the amount of catalyst employed at low temperatures as it is to the amount employed at high temperatures.

In general, the temperature should not exceed about 65° C. and is advantageously between about −30° and about +65° C. When a temperature in the lower part of the range is employed, i. e., a temperature between about −30° and about +25° C., the maximum amount of catalyst to give substantial yields of ethers should be between about 0.18 and about 0.28 mol per cent based on the phenol, the smaller amount of catalyst being used at the higher temperature. At temperatures between about 25° and about 65° C., the maximum amount of catalyst to give substantial yields of ethers should be between about 0.01 and 0.18 mol per cent based on the phenol. Here again the smaller amount of catalyst should be used at the higher temperature. The minimum amount of catalyst will vary somewhat with the particular phenol and catalyst but in general there is no advantage in using less than about 0.01 mol per cent when operating between about −30° and about +25° C. or less than about 0.001 mol per cent when operating between about 25° and about 65° C.

The optimum amount of catalyst varies depending upon the temperature employed, smaller amounts of catalyst being used at higher temperatures. For example, when working with 96 per cent sulfuric acid at about 0° C., the preferred amount of catalyst used is about 0.18 mol per cent based on the phenol. When the same catalyst is used at about 25° C., we have found that an optimum yield of ether is obtained when the amount of catalyst is about 0.025 mol per cent based on the phenol. When temperatures of around 50° to 60° C. are used, the catalyst is used advantageously in amounts of the order of 0.020 to 0.010 mol per cent based on the phenol.

In forming tertiary alkyl aryl ethers in accordance with this invention, we have found that superior results can be obtained at relatively low temperatures. When our process is carried out at −10° C., and in the presence of a relatively small amount of the catalyst with respect to the phenol employed, an ether is the only alkali-insoluble product formed. Consequently, working in the neighborhood of this temperature is of material advantage in the manufacture of ethers for there is a minimum amount of by-products produced.

With the amount of catalyst constant, the yield of ether decreases as the temperature rises. Without limiting ourselves to any theory, this decrease in ether yield with increasing temperature may be considered to be a result of the tendency of the ether to rearrange to form an isomeric alkyl phenol compound. The temperature which can be employed varies in accordance with either the strength of the catalyst or with the amount of the catalyst employed. Taking sulfuric acid as an example, when 96 per cent sulfuric acid is employed as a catalyst, and the amount used is about 0.001 mol per mol of phenolic compound, yields at 60° C. are small; therefore a lower temperature, say 10° to 20° C. should be used. If less of the 96 per cent acid is used, say around 0.0002 mol per mol of phenolic compound, a temperature of as high as 60° C. can be employed. At temperatures above 65° C. using an acid of lower concentration, some ether may be formed but yields are uneconomically low. Thus, although we prefer temperatures which are much lower, say around 10° C., it is obvious that temperatures of 60° C. or even 65° C. can be used depending upon the amount of catalyst used.

In the case of sulfuric acid, the concentration can be changed by diluting the acid. Fuming sulfuric acid, 100 per cent sulfuric acid or acid strengths varying from 96 per cent down to 10 per cent can be used. An acid of 5 per cent concentration could be used but yields would be small. In general it is desirable, but in this case it is particularly advisable, to recover and re-use the unreacted phenol.

Exemplary of the phenols which are employed in preparing ethers by the process of the present invention are simple phenols such as phenol, cresols, xylenols, ethyl phenols, isopropyl phenols, cardanol, thymol, eugenol, carvacrol, and the like. Other phenolic compounds which can be employed are hydroxy carboxylic acids such as salicylic acid and chloro-phenols, nitro-phenols, wax-phenols, hydroxy diphenyls, cyclohexyl phenols, bis(hydroxy-aryl)alkanes, and phenolic ketones such as hydroxy acetophenone and hydroxy benzophenone. However, the reaction is not limited to mono-nuclear phenols. In using a condensed polynuclear phenol such as alpha-naphthanol, it is important to use a suitable solvent.

A solvent is particularly desirable when the phenol used is a solid. However, it may also be desirable to employ a solvent when a liquid phenol is used if the reaction temperature is such as to render the phenol viscous. The solvent provides a common medium for the reactants and also cuts down catalyst concentration. Some of the solvents which we can employ are acetic acid, dioxane, carbon tetrachloride, hexane, diethyl ether, and the like. The particular ether formed in the reaction can also be used as a solvent.

When the phenol is a solid, it is possible to carry out the reaction without a solvent, provided the phenol is present in a form which exposes a large surface area. In this case, the phenol may be finely divided or it can be melted with the catalyst and then isoolefin gas passed into the melt while cooling to produce a spongy mass which presents a large surface for reaction. The solid then slowly becomes wetted by a liquid film of ether and finally goes into solution as the amount of ether formed increases.

Another method which has proved to be very effective at low temperatures when the phenol is a solid involves operating at temperatures at which the isoolefin is in the liquid state at atmospheric pressure; e. g., when isobutylene is used, below −6° C. at atmospheric pressure or at higher temperatures under elevated pressure. The solid phenol then dissolves in the liquid isoolefin and the reaction proceeds at once.

Of the isoolefins which may be used, of particular importance are isobutylene, its polymers such as diisobutylene, triisobutylene, and tetraisobutylene; and tertiary base amylenes such as 2-methyl-butylene-1 and 2-methyl-butylene-2. While it is generally desirable to use the isoolefin as such, other sources of isoolefins are contemplated. For example, alcohols which are converted to isoolefins in the instant process and refinery gases are valuable sources of isoolefins and are within the scope of our invention. Thus when sulfuric acid is used as a catalyst, tertiary butyl alcohol as well as isobutylene can be used. Tertiary amyl alcohol can be used in place of 2-methyl-butylene-1 and 2-methyl-butylene-2. Methyl isobutyl carbinol and diisobutyl carbinol can also be used.

When a C₄ refinery gas is used in this process, the isobutylene will be selectively removed from the refinery gas, especially at low temperatures. It is generally desirable to employ pressure to increase the partial pressure of isobutylene.

The first step of the present process, that is the reaction of the isoolefin with the phenol, involves no special difficulties, the reacting ingredients being simply contacted in any suitable manner. The catalyst is customarily first mixed with the phenol and the isoolefin is then, with rapid agitation, passed into the mixture thus formed. Where the isoolefin is a gas under the existing temperature and pressure conditions, it is ordinarily passed through the mixture and absorbed until the predetermined gain in weight is obtained or until rate of gain in weight becomes impractically slow. This reaction can be carried out under elevated pressures or reduced pressures as well as at atmospheric pressure. In fact at higher pressures the rate of the reaction can be speeded up because the isoolefin will be more soluble in the system. Since the ether-forming reaction is not nearly as exothermic as a nuclear alkylation, no trouble is experienced in dissipating the heat of reaction.

The second step of this process is that of stabilizing the reaction mixture before it is fractionated. When the phenol and isoolefin are reacted in the presence of one of the catalysts mentioned some extraneous non-phenolic acidic materials are usually present in the reaction mixture to a certain extent. For example, when a mixture of meta-cresol and para-cresol is reacted with the isobutylene of a $C_4$ refinery gas cut in the presence of sulfuric acid, the resulting reaction product usually contains a mixture of alkyl phenols and ether, together with some extraneous non-phenolic acidic materials such as sulfuric acid, mono-tert-butyl sulfate, mono-sec-butyl sulfate, di-sec-butyl sulfate, sulfonic acids, sulfones, and the like. These non-phenolic acidic substances release acidic material which causes the rearrangement of the ether to the alkyl phenol on heating, even at the low temperature required for vacuum distillation. Hence, by stabilization we mean preventing the ether formed by the reaction from rearranging to the alkyl phenol.

The importance of stabilization can be appreciated when it is realized that if an amount, sufficient to neutralize, of a dilute aqueous alkali solution such as an aqueous 5 per cent solution of sodium hydroxide is merely added to the reaction product the ether will still rearrange on heating because the reaction product has not been stabilized.

One successful method of stabilizing the phenol-isoolefin reaction product is by alkali extracting or successively washing the reaction product with an aqueous alkali solution containing at least about 10 per cent sodium hydroxide. When this stabilization procedure is employed the reaction product formed will be divided into alkali-soluble and alkali-insoluble portions. The ether can then be recovered from the alkali-insoluble portion. If desired, unreacted phenol can be recovered from the alkali extract and recycled to the reaction system. In some instances the starting phenol may be insoluble in aqueous alkali. It is then desirable to employ some alcohol along with the aqueous alkali. The amount of alcohol may vary with the particular phenol. When di-sec-butyl sulfate is employed as the catalyst, or if it is formed from the sulfuric acid catalyst during the reaction, for example when some normal olefins are present as is usually the case, in a $C_4$ refinery gas cut, this method of stabilization must be modified slightly because the di-sec-butyl sulfate is insoluble in aqueous alkali. In this instance the reaction product should be washed with a non-acid aqueous medium such as water and then the stoichiometric quantity of aqueous alkali containing at least about 10 per cent sodium hydroxide added before distillation. A stabilization method of this type is disclosed in co-pending application Serial No. 124,725.

Another convenient method which can be used for stabilizing the acidic phenol-isoolefin reaction product is disclosed in application Serial No. 124,723, now U. S. Patent No. 2,570,403. The stabilization procedure disclosed in said latter application comprises washing said reaction product with a non-acid aqueous medium and intimately contacting the washed product with at least a stoichiometric quantity of an alkaline agent necessary to neutralize the extraneous non-phenolic acidic matter in said washed product, said alkaline agent selected from the group consisting of aliphatic and heterocyclic amines. A stabilization method similar to that disclosed in application Serial No. 124,723, now U. S. Patent No. 2,570,403, is disclosed in co-pending application Serial No. 124,722, except in the latter application an alkali metal phenate or alkali metal alcoholate is employed in lieu of the aliphatic or heterocyclic amine employed in U. S. Patent No. 2,570,403.

An additional stabilization procedure is disclosed in co-pending application Serial No. 124,724, wherein the reaction product is first washed with a non-acid aqueous medium and then intimately contacted with an adsorbent clay at 70° to 150° C. In instances where the acidic phenol-isoolefin reaction product is not washed with a non-acid aqueous medium stabilization can be effected by adding to the reaction product at least 1.5 times the stoichiometric quantity of an alkali metal phenate necessary to neutralize the extraneous non-phenolic acidic matter. The latter method of stabilization is disclosed in co-pending application Serial No. 124,721. The reaction product can also be stabilized by washing said product with a dilute alkali and then refluxing the resulting product with alcoholic potash.

Whatever method of stabilization is employed we prefer, except when di-sec-butyl sulfate is employed as the catalyst, to separate the phenol-olefin reaction product into alkali-soluble and alkali-insoluble portions by extraction with an alkali either before or after stabilization. If the alkali is used merely for separation and not stabilization an aqueous solution of less than about 10 per cent concentration can be used. After the stabilization step the entire mixture may be distilled, or, where possible, the alkali-insoluble layer may be recovered and fractionated to remove the ether.

Our process can be more clearly understood by referring to the following illustrative examples.

EXAMPLE I

In this example, 0.51 gm. (0.05 per cent—0.000552 mol $H_2SO_4$ per mol of cresol) of concentrated (96 per cent) sulfuric acid was added to 1015.6 gms. (9.43 mols) of o-cresol. Isobutylene was passed into the agitated mixture which was held at a temperature of 45–50° C. for 40 minutes. The increase in weight was 232.2 gms. (4.16 mols isobutylene added). The product was then treated with 20 per cent aqueous NaOH and separated into alkali-soluble and alkali-insoluble portions. The alkali-insoluble material weighed 457.3 gms. Fractional distillation of this alkali-insoluble portion gave 225.8 gms. of tert-butyl-o-tolyl ether (B. P., 95.0° C./20 mm.), 151 gms. of 6-tert-butyl-2-methyl phenol and 77.5 gms. of 4,6-di-tert-butyl-2-methyl phenol. The yield of tert-butyl-o-tolyl ether was calculated to be 14.6 per cent based on the o-cresol charged and 35.4 per cent based on the o-cresol consumed.

EXAMPLE II

In this example, isobutylene was passed into one mol (94.1 gms.) of phenol, containing 0.050 gm. (0.053 per cent—0.00051 mol $H_2SO_4$ per mol of phenol) of concentrated (96 per cent) sulfuric acid until 47.0 gms. (0.84 mol) had been absorbed. The reaction was carried out at 8° C. While the absorption took place fairly readily at the start, the rate slowed down noticeably as the reaction proceeded. Practically no isobutylene was being absorbed at the end of 5½ hours when the reaction was stopped. On neutralization with 10 per cent aqueous alkali, the product was divided into alkali-soluble and alkali-insoluble portions. The alkali-insoluble portion (61.0 gms.) gave on fractional distillation, 53.5 gms. of tert-butyl phenyl ether (80° C./20 mm.), and 3.0 gms. of higher boiling distillate, probably 2,4-di-tert-butyl phenol. The yield of the tert-butyl phenyl ether was calculated to be 35.7 per cent based on phenol charged, and 69.2 per cent based on phenol consumed.

EXAMPLE III

To prepare the tert-butyl ether of p-tert-butyl phenol, a new compound, isobutylene gas, was passed into 1 mol (150 gms.) of p-tert-butyl phenol containing 0.15 gm. (0.1 per cent—0.00153 mol $H_2SO_4$ per mol of butyl phenol) of concentrated (96 per cent) sulfuric acid. The reaction was carried out at 5° C. The technique used was to melt the p-tert-butyl phenol and catalyst at 100° C. and quickly cool to 5° C. while passing isobutylene through the mixture. The mass worked itself into a mush and gradually into a liquid as more isobutylene was absorbed. At the end of 4 hours the increase in weight was 71 gms. (1.27 mols isobutylene added). The product was washed with 10 per cent aqueous alkali and divided into alkali-soluble and alkali-insoluble portions. The alkali-insoluble portion was an oil, which on fractional distillation gave 70.5 gms. tert-butyl ether of p-tert-butyl phenol (125–128° C./20 mm.), 25 gms. of transition material (128–144° C./20 mm.), 34.5 gms. of 2,4-di-tert-butyl phenol and 26.5 gms. of higher boiling material (probably 2,4,6-tri-tert-butyl phenol 146° C.—up/20 mm.). The yield of the tert-butyl ether of p-tert-butyl phenol was 33.9 per cent based on p-tert-butyl phenol charged and 44.3 per cent based on p-tert-butyl phenol consumed.

EXAMPLE IV

Isobutylene was conducted into 108.0 gms. of a commercial mixture of m- and p-cresols, (60 per cent m-cresol and 40 per cent p-cresol), containing 0.1242 gm. of concentrated (96 per cent) sulfuric acid (0.00127 mol $H_2SO_4$ per mol of the cresols). A temperature ranging from −6° to −4° C. was maintained until an increase in weight of 53.9 gms. was obtained. The reaction product was then washed with 20 per cent aqueous alkali. The alkali-insoluble portion weighed 44.0 gms. On fractionation, the alkali-insoluble portion yielded 38.8 gms. of the mixed tert-butyl ethers of m- and p-cresol, coming over at 96° to 97° C./20 mm. The ether yield was 75.4 per cent based on cresol consumed.

EXAMPLE V

In preparing this ether 77.1 gms. (0.35 mol) of nonyl phenol were alkylated at 3° to 5° C. with isobutylene. Concentrated (96 per cent) sulfuric acid (0.05 ml.; 0.0935 gms.; 0.0027 mol $H_2SO_4$ per mol nonyl phenol) was used as the catalyst; this is 0.121 per cent by weight of the nonyl phenol. The nonyl phenol is a liquid, a commercial product reported to be an isomeric mixture in which the para-substituted isomer predominates. After 1.5 hours, the gain in weight was 44.0 gms. On allowing the mixture to warm to room temperature, the net gain in weight was 26.8 gms.; 17.2 gms. of dissolved isobutylene evaporating off. The reaction product was then refluxed with alcoholic KOH. Unreacted nonyl phenol was thereafter removed from the reaction product by extraction with an alcoholic solution consisting of 100 ml. of 20 per cent aqueous sodium hydroxide and 65 ml. of methyl alcohol. The insoluble portion was water-washed and dried over anhydrous $CaCl_2$. The oily product, weighing 60.9 gms. was fractionated through an efficient column at 20 mm. Hg pressure. The following data were obtained:

| Temp., ° C. | Vol. (ml.) | Wt. (gms.) | Identity |
|---|---|---|---|
| 153 to 174 | | 4.4 | Light ends. |
| 174 to 182 | 56.0 | 49.1 | t-butyl ether of nonyl phenol. |
| 182 to above | | 6.9 | Distillation residue. |

The yield of the ether was 50.8 per cent based on the nonyl phenol charged. An infrared absorption spectrum showed that there were no phenolic hydroxyl groups present in the product.

EXAMPLE VI

To one mol of 2,5-dimethyl phenol (122.0 gms.) was added 0.2 gm. concentrated (96 per cent) sulfuric acid (0.00204 mol $H_2SO_4$ per mol of the phenol) in a 500 ml. 3-neck flask. The contents were cooled to −50° C. in a Dewar flask and isobutylene was fed into the system. When liquid isobutylene had half filled the flask and had dissolved the 2,5-dimethyl phenol, the system was allowed to warm to −6° C. (in the 3 necks were a vent, thermometer, and a dry ice-acetone filled cold finger) and held overnight (about 19 hours) at this temperature. The excess isobutylene was then allowed to boil away and the reaction product was washed with 20 per cent aqueous NaOH. About 5 ml. of an alkali-insoluble oil was collected which possessed the characteristic odor of t-alkyl aryl ethers.

EXAMPLE VII

In preparing this ether 82.4 gms. (0.4 mol) of p-diisobutyl phenol were dissolved in 35 ml. glacial acetic acid. To this was added 0.05 ml. (0.0935 gms.) of concentrated (96 per cent) sulfuric acid (0.0024 mol $H_2SO_4$ per mol diisobutyl phenol), which is 0.115 per cent of the p-diisobutyl phenol. Isobutylene was passed through, first at 26° C. to provide a liquid system, and then cooled to 6° C. during the next 15 minutes (the ether formed after the reaction started kept the system liquid at the lower temperature). After two hours, the gain in weight was 50.3 gms., but on standing overnight at 0° C. this was reduced to 28.7 gms. as a result of evaporation of dissolved isobutylene. The mixture was water-washed to remove the acetic and sulfuric acids, and given a final neutralization with alcoholic KOH. Unreacted p-diisobutyl phenol was removed from the product by several extractions with a solution made up of 100 ml. of 20 per cent aqueous NaOH and 75 ml. of methyl alcohol. The remaining liquid was water-washed and dried over $CaCl_2$. The oily product, 27.9 gms., was distilled from a Claissen flask at 20 mm. Hg pressure, over sodium chips. The following data were collected:

| Temp., °C. | Vol (ml.) | Wt. (gms.) | Identity |
|---|---|---|---|
| 118 to 167 | | 1.8 | Light ends. |
| 167 to 172 | 26.0 | 23.2 | t-butyl-p-octyl-phenyl ether. |
| 172 to above | | 2.8 | Distillation residue. |

The yield of the ether is 22.1 per cent based on the p-diisobutyl phenol charged. A redistillation of the ether fraction through an efficient fractionating column showed it to boil at 168° C./20 mm. Infrared absorption analysis showed it to be free of compounds containing phenolic groups (i. e. free of phenols).

EXAMPLE VIII

In accordance with the above examples an ether was prepared by reacting 35.6 gms. of isobutylene with 108 gms. of m-cresol in the presence of 0.0024 mol $H_2SO_4$ per mol of cresol, the acid being added in the form of 10 per cent aqueous sulfuric acid. The reaction was carried out at a temperature of 23° C. Fractional distillation of the alkali-insoluble portion, which weighed 47.7 gms. gave 39.3 gms. of tert-butyl-m-tolyl ether which is a liquid having a boiling point of 96.0° C./20 mm. No 4,6-di-tert-butyl-3-methyl phenol was formed but the alkali-insoluble portion did contain 5.9 gms. of 6-tert-butyl-3-methyl phenol. The yield of tert-butyl-m-tolyl ether was calculated to be 24.2 per cent based on the cresol charged and 80.2 per cent based on the cresol consumed.

EXAMPLE IX

In accordance with the above examples an ether was prepared by reacting 109.7 gms. of isobutylene with 270.0 gms. of m-cresol in the presence of 0.026 per cent based on the cresol of 96 per cent sulfuric acid (0.00029 mol $H_2SO_4$ per mol of cresol). The reaction was carried out at 23° C. The alkali-insoluble material weighed 204.7 gms. Fractional distillation of this alkali-insoluble portion gave 163.7 gms. of tert-butyl-m-tolyl ether, 26.7 gms. of 6-tert-butyl-3-methyl phenol and no 4,6-di-tert-butyl-3-methyl phenol. The yield of tert-butyl-m-tolyl ether was calculated to be 40.0 per cent based on the m-cresol charged and 68.0 per cent based on the m-cresol consumed.

EXAMPLE X

In accordance with the above examples an ether was prepared by reacting 7306 gms. (5.35 mols) of a mixture of ortho-, meta-, and para-isopropyl phenols with isobutylene at 25° C. A small amount, 21.5 gms. (0.00245 mol per mol of isopropyl phenol), of 60 per cent sulfuric acid was used. The theoretical amount of isobutylene for one mol addition was 3224 gms. At the end of 9.5 hours when 2458 gms. of isobutylene had been absorbed the reaction was stopped. A 1525 gm. portion of the reaction product was treated with 20 per cent aqueous alkali yielding 986.8 gms. of alkali-insoluble material, which on fractionation gave 587.6 gms. of mixed tertiary butyl isopropyl ethers.

EXAMPLE XI

This example was carried out using the same technique as employed when small amounts of sulfuric acid are used as the catalyst as in the above examples. To 108 grams (1 mol) meta-cresol was added 0.11 gm. (0.103 per cent—0.00052 mol per mol of the cresol) of di-sec-butyl sulfate (which had previously been thoroughly washed with water until the washings gave no precipitate on adding to aqueous barium chloride). Isobutylene was passed into the mixture at 23° C. At the end of 5.5 hours the gain in weight was 40.9 grams. When the gain in weight was 44.6 grams and the rate of absorption has become quite slow the addition of isobutylene was ceased (after 10.5 hours). The product was extracted with 10 per cent alkali to divide it into an alkali-soluble portion weighing 49.4 grams and an alkali-insoluble portion weighing 76.6 grams. To stabilize the reaction product against the rearranging effect of di-sec-butyl sulfate contained in the alkali-insoluble portion, 50 milliliters of 10 per cent alcoholic KOH were added to said alkali-insoluble portion which was then refluxed for three hours on a steam bath. On water washing and drying over calcium chloride, 73.9 grams of the alkali-insoluble material were recovered. On fractionation there were collected: 76.7 milliliters (68.9 grams, 0.42 mol) of tert-butyl-m-tolyl ether (95° C. to 96° C./20 mm.), 1.7 milliliters (1.5 grams) of transition material (96° C. to 127° C./20 mm.), and 1.2 milliliters (1 gram) of 6-tert-butyl-3-methyl phenol (127° C. to 129° C./20 mm.). This represents the yield of 42 per cent based on meta-cresol charged and 77.8 per cent based on meta-cresol consumed assuming that all of the alkali-soluble portion (49.4 grams—0.46 mol) recovered was metacresol.

Referring now to the above examples, Examples I through XI illustrate a preferred method of carrying out our process. It is apparent that the process is applicable to the production of a wide variety of ethers. The examples illustrate that tertiary alkyl aryl ethers are obtainable by the present process in a convenient and desirable manner.

The effect upon the yield of tertiary alkyl aryl ether of variables such as the temperature, amount of catalyst and the strength of the catalyst can best be illustrated in tabular form.

The effect of the temperature was determined by using approximately 0.1 per cent of 96 per cent sulfuric acid as the catalyst and varying the temperature over a range from −10° C. to 60° C. The results obtained are tabulated in Table I.

*Table I*

TEMPERATURE SERIES

| Temperature, °C. | −10 | 10 | 45 | 59 |
|---|---|---|---|---|
| m-Cresol, gms. | 109.3 | 270.0 | 110.1 | 186.9 |
| Amount of 96% $H_2SO_4$, gms. | 0.1075 | 0.304 | 0.1105 | 0.1860 |
| Mol $H_2SO_4$ mol m-cresol | 0.00106 | 0.00119 | 0.00106 | 0.00105 |
| Mol percent 96% $H_2SO_4$ | 0.106 | 0.119 | 0.106 | 0.105 |
| Isobutylene added, gms. | 72.2 | 133.0 | 53.0 | 84.9 |
| Alkali-insoluble, gms. | 58.6 | 246.5 | 83.0 | 162.3 |
| Tert-butyl-m-tolyl ether (96.0° C./20 mm.), gms. | 55.2 | 146.2 | 31.6 | 3.9 |
| 6-tert-butyl-m-cresol (129.5° C./20 mm.), gms. | 0.0 | 72.2 | 47.2 | 79.3 |
| 4,6-di-tert-butyl-m-cresol (167.0° C./20 mm.), gms. | 0.0 | 0.0 | 0.0 | 70.6 |
| Distillation and handling loss, gms. | 3.4 | 28.1 | 4.2 | 8.5 |
| m-Cresol consumed, gms. | 43.7 | 183.0 | 62.2 | 109.8 |
| Yield of tert-butyl-m-tolyl ether, percent: | | | | |
| Based on m-cresol charged | 33.2 | 35.5 | 18.6 | 1.38 |
| Based on m-cresol consumed | 83.3 | 52.5 | 33.4 | 2.38 |
| Time of run, min. | 120 | 150 | 96 | 96 |

It is evident that the yield of the tertiary butyl ether decreases as the temperature rises.

This is possibly a result of the tendency of ether to rearrange to form isomeric substituted phenols. It is noted that the yield of ether when 96 per cent sulfuric acid is used is the largest at 10° C. and at 60° C. is only 3.9 per cent. However at −10° C. no side reaction products were formed. It is obvious that the higher temperatures are undesirable.

Table II shows the effect upon the tertiary alkyl aryl ether yield of various amounts of 96 per cent sulfuric acid.

Table II
AMOUNT OF H₂SO₄ SERIES

| Amount 96% H₂SO₄, gms | 0.556 | 0.142 | 0.069 |
|---|---|---|---|
| Mols H₂SO₄/mol m-cresol | 0.00217 | 0.00054 | 0.00027 |
| Mol percent H₂SO₄ | 0.217 | 0.054 | 0.027 |
| m-Cresol, gms | 270.0 | 270.0 | 270.0 |
| Temperature, °C | 23.0 | 23.0 | 23.0 |
| Isobutylene added, gms | ¹138.1 | ²122.7 | ³109.7 |
| Alkali-insoluble, gms | 366.2 | 219.0 | 204.7 |
| Tert-butyl-m-tolyl ether, gms | 28.3 | 150.6 | 163.7 |
| 6-tert-butyl-3-methyl phenol, gms | 64.1 | 52.7 | 26.7 |
| 4,6-di-tert-butyl-3-methyl phenol, gms | ⁴77.3+ | 12.3 | 0.0 |
| Distillation and handling loss, gms | | 3.4 | 14.3 |
| m-Cresol consumed, gms | 205.9 | 179.3 | 158.8 |
| Yield of tert-butyl-m-tolyl ether, percent: | | | |
| Based on m-cresol charged | 6.7 | 38.0 | 40.0 |
| Based on m-cresol consumed | 9.7 | 57.3 | 68.0 |

¹ 2.46 mols.
² 2.19 mols.
³ 1.96 mols.
⁴ Accident with sample—some lost.

Table II above shows that at about 25° C., specifically 23° C., the best alkyl aryl ether yield is obtained by using 0.026 per cent of 96 per cent sulfuric acid or 0.00027 mol of sulfuric acid per mol of m-cresol. It is clear that it is not necessary to use more than 0.2 per cent of 96 per cent sulfuric acid as a catalyst at about 25° C. In addition, as previously emphasized, the amount of catalyst varies with the temperature employed, smaller amounts of catalyst being used at higher temperatures, and larger amounts of catalyst being used at lower temperatures within the ranges given.

Table III
VARYING THE AMOUNT OF 10% H₂SO₄

| Strength of H₂SO₄, percent | 10.0 | 10.0 | 10.0 |
|---|---|---|---|
| Catalyst, gms | 2.350 | 4.70 | 9.40 |
| m-Cresol, gms | 108.0 | 108.0 | 108.0 |
| Mols H₂SO₄/mol cresol | 0.0024 | 0.0048 | 0.0096 |
| Mol percent H₂SO₄ | 0.24 | 0.48 | 0.96 |
| Temperature, °C | 23.0 | 23.0 | 23.0 |
| Isobutylene added, gms | 35.6 | 43.2 | 20.5 |
| Alkali-insoluble, gms | 47.7 | 34.1 | 3.1 |
| t-Butyl-m-tolyl ether, gms | 39.3 | 28.6 | ¹3.1 |
| 6-t-butyl-3-methyl phenol, gms | 5.9 | 0.0 | |
| 4,6-di-t-butyl-3-methyl phenol, gms | 0.0 | 0.0 | |
| Distillation and handling loss, gms | 2.5 | 5.5 | |
| m-Cresol consumed, gms | 32.3 | 37.3 | 7.0 |
| Yield of t-butyl-m-tolyl ether, percent: | | | |
| Based on m-cresol charged | 24.2 | 17.4 | 1.9 |
| Based on m-cresol consumed | 80.2 | 50.3 | 29.2 |

¹ Product not sufficient in quantity to be distilled; assumed to be entirely t-butyl-m-tolyl ether.

The data given in Table III show that ether formation decreases as the amount of 10 per cent sulfuric acid is increased. When an acid of this strength is used as the catalyst, favorable yields are still obtained when as much as 0.44 per cent of actual H₂SO₄ based on the phenol are employed at 23° C. With concentrated sulfuric acid, an amount of only 0.21 per cent of 96 per cent H₂SO₄ based on the m-cresol gave a poor yield of the ether at 23° C. (see Table II).

As heretofore pointed out the yield of tertiary alkyl aryl ether also varies with the strength of the acid employed as a catalyst. Table IV shows this effect at a temperature of 23° C. when approximately 0.0025 mol of sulfuric acid per mol of cresol is used.

Table IV
STRENGTH OF H₂SO₄ SERIES

| Strength H₂SO₄, percent | 96.0 | 75.0 | 60.0 | 40.0 | 10.0 |
|---|---|---|---|---|---|
| Catalyst, gms | 0.556 | 0.791 | 0.372 | 0.646 | 2.350 |
| m-Cresol, gms | 270.0 | 270.0 | 109.6 | 107.7 | 108.0 |
| Mols H₂SO₄/mol cresol | 0.00217 | 0.00242 | 0.00228 | 0.00264 | 0.00240 |
| Temperature, °C | 23.0 | 23.0 | 23.0 | 23.0 | 23.0 |
| Isobutylene added, gms | 138.1 | 139.9 | 52.0 | 49.1 | 35.6 |
| Alkali-insoluble, gms | 366.2 | 242.7 | 95.8 | 83.3 | 47.7 |
| Tert-butyl-m-tolyl ether, gms | 28.3 | 153.8 | 75.8 | 69.6 | 39.3 |
| 6-tert-butyl-3-methyl phenol, gms | 64.1 | 42.1 | 13.8 | 11.2 | 5.9 |
| 4,6-di-tert-butyl-3-methyl phenol, gms | ¹77.3+ | 16.2 | 0.0 | 0.0 | 0.0 |
| Distillation and handling loss, gms | | 30.6 | 6.2 | 2.5 | 2.5 |
| m-Cresol consumed, gms | 205.9 | 165.3 | 73.1 | 67.3 | 32.3 |
| Yield of tert-butyl-m-tolyl ether, percent: | | | | | |
| Based on m-cresol charged | 6.7 | 37.5 | 45.6 | 42.4 | 24.2 |
| Based on m-cresol consumed | 9.7 | 61.2 | 68.4 | 68.1 | 80.2 |

¹ Accidental loss of part of sample.

Although as shown in Table IV the best yields were obtained over the range of 40 to 75 per cent acid strength, at 23° C., the 96 per cent and 10 per cent catalysts can also be employed.

It has been previously pointed out that the acids used as catalysts can be weakened by dilution with water. Another embodiment of the present invention consists of diluting the acid, sulfuric acid in particular, with glycerine or other solvent in lieu of water. The following example illustrates this particular embodiment.

EXAMPLE XII

In this example 96 per cent sulfuric acid was first converted to 100 per cent H₂SO₄ by the addition of 5.93 gms. fuming H₂SO₄ to 10 gms. of concentrated (96%) acid. To 8.30 gms. of the 100 per cent acid was added 11.7 gms. of glycerin, making a final product containing 41.5 wt. per cent of H₂SO₄ and 58.5 wt. per cent of glycerin. The process of the present invention was then carried out using m-cresol and isobutylene. In one instance, for comparative purposes, 75 per cent aqueous sulfuric acid (A) was used as a catalyst, and in the other instance the sulfuric acid-glycerin composition (B) was used as a catalyst. The following are the results obtained with these two compositions as catalysts:

Table V

| | A | B |
|---|---|---|
| m-Cresol, gms | 270.0 | 110.6 |
| H₂SO₄ Catalyst, gms | 0.791 | 0.59 |
| Strength H₂SO₄, percent | 75.0 | |
| Mols H₂SO₄/mol m-cresol | 0.00242 | 0.00250 |
| Mols H₂O/mol m-cresol | 0.00433 | |
| Mols glycerin/mol m-cresol | | 0.00346 |
| Temperature, °C | 23.0 | 23.0 |
| Isobutylene added, gms | 139.9 | 41.2 |
| Alkali-insoluble, gms | 242.7 | 101.3 |
| Tert-butyl-m-tolyl ether, gms | 153.8 | 77.8 |
| 6-tert-butyl-3-methyl phenol, gms | 42.1 | 21.3 |
| 4,6-di-tert-butyl-3-methyl phenol, gms | 16.2 | 0.0 |
| Distillation and handling loss, gms | 30.6 | 2.2 |
| m-Cresol consumed, gms | 165.3 | 68.9 |
| Yield of tert-butyl-m-tolyl ether, percent: | | |
| Based on m-cresol charged | 37.5 | 47.5 |
| Based on m-cresol consumed | 61.2 | 74.2 |

The preceding example shows one advantage obtained by using glycerin in lieu of water. When glycerin is used no cresol is consumed by the formation of 4,6-di-tert-butyl-3-methyl phenol. The example also shows that sulfuric acid can be diluted with glycerin just as successfully as with water.

From the above examples and tables it is evident that the present invention provides a desirable and convenient method of preparing tertiary alkyl aryl ethers in substantial yields. In addition, the products formed by the present process will doubtless find utility in many arts, such as in the manufacture of perfumes and other odorants, or as solvents. Derivatives of the tertiary alkyl aryl ethers will also find use in many fields.

Obviously many modifications of the invention as hereinbefore set forth may be made without departing from the spirit and scope thereof, and therefore only such limitations should be imposed as are indicated in the appended claims.

We claim:

1. A process for preparing a tertiary alkyl aryl ether which comprises reacting an isoolefin and a phenol at a temperature not exceeding about 65° C. and in the presence of a trace, not exceeding about 0.28 mol per cent based on the phenol, of a catalyst selected from the group consisting of sulfuric acid, chlorosulfonic acid, benzene sulfonic acid, alkali metal acid sulfates, alkyl acid sulfates having 1 to 9 carbon atoms and di-sec-alkyl sulfates having 3 to 6 carbon atoms in each alkyl group, the amount of said catalyst being varied depending upon the temperature employed, smaller amounts of the catalyst being used at higher temperatures; and stabilizing the resulting reaction product containing a tertiary alkyl aryl ether against said ether's rearranging to form the corresponding alkyl phenol.

2. A process for preparing a tertiary alkyl aryl ether which comprises reacting an isoolefin and a phenol at a temperature not exceeding about 65° C. and in the presence of a trace, not exceeding about 0.28 mol per cent based on the phenol, of a catalyst selected from the group consisting of sulfuric acid, chlorosulfonic acid, benzene sulfonic acid, alkali metal acid sulfates, alkyl acid sulfates having 1 to 9 carbon atoms and di-sec-alkyl sulfates having 3 to 6 carbon atoms in each alkyl group, the amount of said catalyst being varied depending upon the temperature employed, smaller amounts of the catalyst being used at higher temperatures; stabilizing the resulting reaction product containing a tertiary alkyl aryl ether against said ether's rearranging to form the corresponding alkyl phenol; dividing the stabilized product into alkali-soluble and alkali-insoluble portions; and recovering said ether from the alkali-insoluble portion.

3. A process for preparing a tertiary alkyl aryl ether which comprises reacting an isoolefin and a phenol at a temperature not exceeding about 65° C. and in the presence of a trace, not exceeding about 0.28 mol per cent based on the phenol, of a catalyst selected from the group consisting of sulfuric acid, chlorosulfonic acid, benzene sulfonic acid, alkali metal acid sulfates, alkyl acid sulfates having 1 to 9 carbon atoms and di-sec-alkyl sulfates having 3 to 6 carbon atoms in each alkyl group, the amount of said catalyst being varied depending upon the temperature employed, smaller amounts of the catalyst being used at higher temperatures; dividing the reaction product into alkali-soluble and alkali-insoluble portions; stabilizing the alkali-insoluble portion containing a tertiary alkyl aryl ether against said ether's rearranging to form the corresponding alkyl phenol; and recovering said ether from the stabilized product.

4. A process for preparing a tertiary alkyl aryl ether which comprises reacting an isoolefin and a phenol at a temperature not exceeding about 65° C. and in the presence of a trace, not exceeding about 0.28 mol per cent based on the phenol, of a catalyst selected from the group consisting of sulfuric acid, chlorosulfonic acid, benzene sulfonic acid, alkali metal acid sulfates, alkyl acid sulfates having 1 to 9 carbon atoms and di-sec-alkyl sulfates having 3 to 6 carbon atoms in each alkyl group, the amount of said catalyst being varied depending upon the temperature employed, smaller amounts of the catalyst being used at higher temperatures; stabilizing the resulting reaction product by extracting said product with an aqueous alkali containing at least about 10 per cent sodium hydroxide; and recovering a tertiary alkyl aryl ether from the remaining alkali-insoluble material.

5. A process for preparing a tertiary alkyl aryl ether which comprises reacting an isoolefin and a phenol at a temperature not exceeding about 65° C. and in the presence of a trace of sulfuric acid not exceeding about 0.28 mol per cent $H_2SO_4$ based on the phenol, the amount of said catalyst being varied depending upon the temperature employed, smaller amounts of the catalyst being used at higher temperatures; stabilizing the resulting reaction product by extracting said product with an aqueous alkali containing at least about 10 per cent sodium hydroxide; and recovering a tertiary alkyl aryl ether from the remaining alkali-insoluble material.

6. A process for preparing the tertiary butyl ether of a phenol which comprises reacting isobutylene with a phenol at a temperature of about $-30°$ C. to about 25° C. and in the presence of a trace of sulfuric acid not exceeding about 0.28 mol per cent $H_2SO_4$ based on the phenol, stabilizing the resulting reaction product containing the tertiary butyl ether of said phenol against said ether's rearranging to form the corresponding butyl phenol, and recovering said ether from the stabilized product.

7. A process for preparing the tertiary butyl ether of p-tert-butyl phenol which comprises reacting isobutylene with p-tert-butyl phenol at a temperature of about $-30°$ to about 25° C. and in the presence of a trace of sulfuric acid not exceeding about 0.28 mol per cent $H_2SO_4$ based on the p-tert-butyl phenol, stabilizing the resulting reaction product containing the tertiary butyl ether of said phenol against said ether's rearranging to form the corresponding di-butyl phenol, and recovering said ether from the stabilized product.

8. A process for preparing a tertiary alkyl aryl ether which comprises reacting an isoolefin and a phenol at a temperature of about $-30°$ C. to about 25° C. and in the presence of a small amount of dilute sulfuric acid not exceeding 0.55 mol per cent $H_2SO_4$ based on the phenol, stabilizing the resulting reaction product containing a tertiary alkyl ether of said phenol against said ether's rearranging to form the corresponding alkyl phenol, and recovering said ether from the stabilized product.

9. A process for preparing the tertiary butyl ether of m-cresol which comprises reacting isobutylene with m-cresol at a temperature of about $-30°$ to about 25° C. and in the presence of a small amount of sulfuric acid not exceeding 0.55 mol per cent $H_2SO_4$ based on the m-cresol and exclusive of the weight of the water, said sulfuric acid having been employed in the form of about a 10 per cent aqueous solution; stabilizing the resulting reaction product containing the tertiary butyl ether of said m-cresol against said ether's rearranging to form the corresponding butyl-m-cresol; and recovering the ether from the stabilized product.

10. A process for preparing a tertiary alkyl aryl ether which comprises reacting an isoolefin and a phenol at a temperature of about $-30°$ to about $25°$ C. and in the presence of a trace of a sulfuric acid-glycerin catalyst not exceeding about 0.28 mol per cent $H_2SO_4$ based on the phenol, stabilizing the resulting reaction product containing a tertiary alkyl aryl ether against said ether's rearranging to form the corresponding alkyl phenol, and recovering said ether from the stabilized product.

11. A process for preparing a tertiary alkyl aryl ether which comprises reacting an isoolefin and a phenol at a temperature not exceeding about $65°$ C. and in the presence of a trace of di-sec-butyl sulfate not exceeding about 0.28 mol per cent based on the phenol, the amount of said catalyst being varied depending upon the temperature employed, smaller amounts of the catalyst being used at higher temperatures; dividing the reaction product into alkali-soluble and alkali-insoluble portions; stabilizing the alkali-insoluble portion containing a tertiary alkyl aryl ether against said ether's rearranging to form the corresponding alkyl phenol; and recovering said ether from the stabilized product.

DONALD R. STEVENS.
ROBERT S. BOWMAN.

References Cited in the file of this patent

UNITED STATES PATENTS

| Number | Name | Date |
| --- | --- | --- |
| 2,010,356 | Evans et al. | Aug. 6, 1935 |
| 2,080,034 | Evans et al. | May 11, 1936 |
| 2,256,612 | Ellis | Sept. 23, 1941 |
| 2,264,371 | Harvey | Dec. 2, 1941 |
| 2,477,091 | Rosenwald | July 26, 1949 |

OTHER REFERENCES

Fuson et al., "Organic Chemistry," John Wiley and Sons, New York, (1946), page 52.